(No Model.)
L. M. ERB.
AUTOMATIC TROLLEY SWITCH.
No. 571,517.  Patented Nov. 17, 1896.
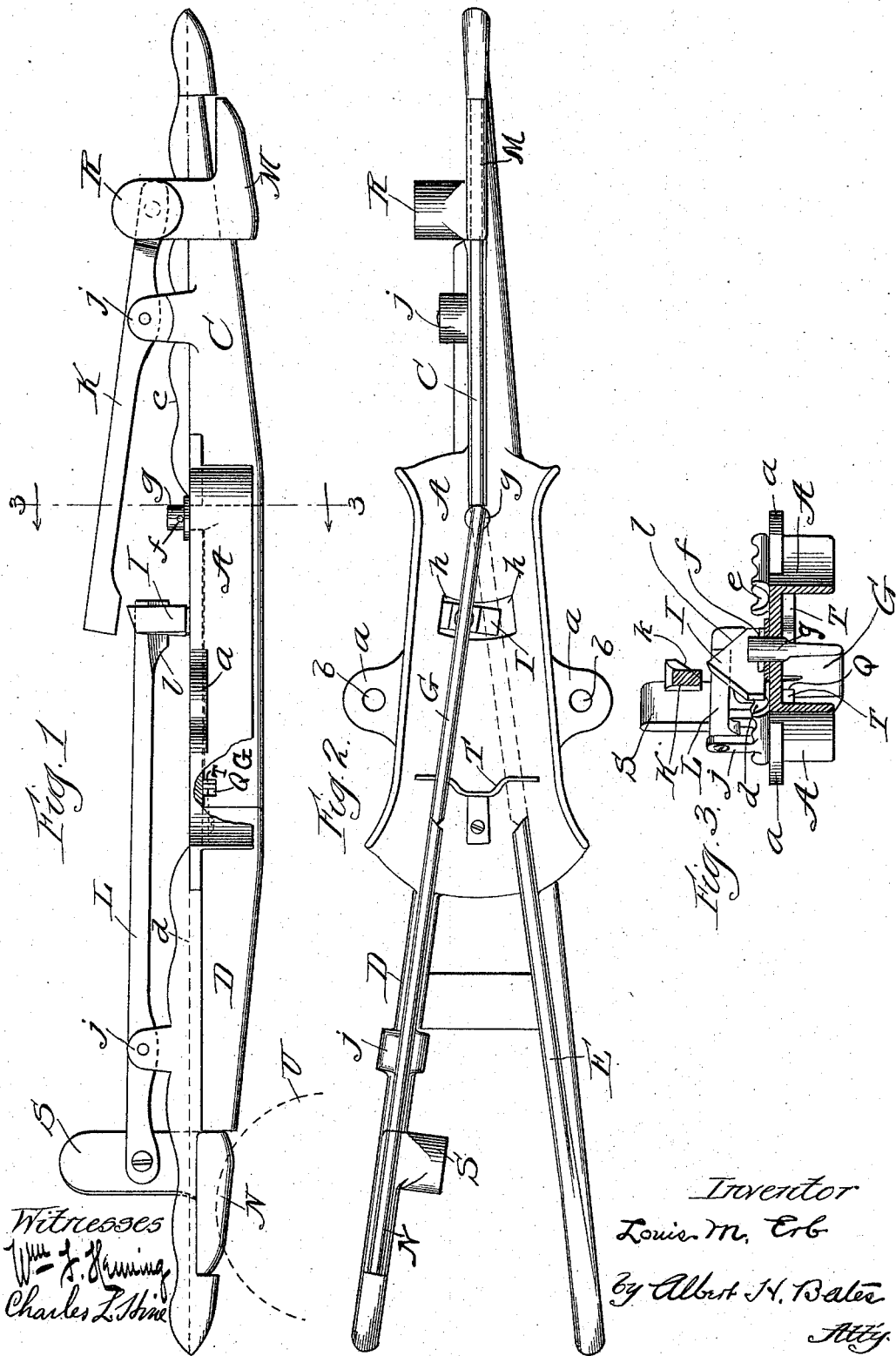
Witnesses
Wm. F. Huning
Charles L. Hine
Inventor
Louis M. Erb
by Albert H. Bates
Atty.

UNITED STATES PATENT OFFICE.

LOUIS M. ERB, OF LEAVENWORTH, KANSAS.

AUTOMATIC TROLLEY-SWITCH.

SPECIFICATION forming part of Letters Patent No. 571,517, dated November 17, 1896.

Application filed February 29, 1896. Serial No. 581,233. (No model.)

*To all whom it may concern:*

Be it known that I, LOUIS M. ERB, a citizen of the United States, residing at Leavenworth, in the county of Leavenworth, State of Kansas, have invented a certain new and useful Improvement in Automatic Trolley-Switches, of which the following is a full, clear, and exact description, reference being had to the accompanying drawings.

The object of my invention is to provide a trolley-switch in which the trolley-track of the main line shall be automatically and positively connected with the trolley-track of either of the branch lines.

My improved switch is particularly adapted for overhead use in connection with the ordinary under-running trolley of an electric car, and by its use the switching operation is rendered totally independent of the lateral movement of the car. It thus enables the switch to be taken at a much higher speed than is possible with the old switch, where the turn of the car determined upon which branch the trolley was to run, and where it was necessary to run at a slow speed to prevent the trolley from leaving the conductor, and at the same time it obviates the necessity of the very careful placement of the switch with reference to the switch of the track. It also avoids or greatly diminishes the injurious arcing between the trolley-wheel and the switch.

My invention consists of a movable tongue so arranged in connection with the pan or plate of the switch and the ribs projecting therefrom as to be able to connect the main rib with either of the branch ribs in connection with mechanism operated by the trolley for shifting the tongue.

It consists also in the combinations of parts hereinafter specified, and more definitely pointed out in the claims.

In the drawings, Figure 1 is an elevation of my improved switch; Fig. 2, a bottom view thereof; and Fig 3, a transverse section on the line 3 3 of Fig. 1, looking to the left of said figure.

Similar letters of reference designate similar parts in each figure.

A represents the pan of the switch, which may be made in any desired manner and is preferably provided with ears $a$, having holes $b$ in them, in which guy-wires take. Extending from this pan on the under side thereof and preferably made integral therewith is the main rib C, and at the opposite end of the pan are the branch ribs D and E, made preferably in the same manner.

The switch is secured to the wires of the line preferably by means of an ordinary clamp, and the electrical connection is insured by having the wires soldered in the grooves $c$, $d$, and $e$ in the top of the ribs. Pivoted to the pan on its under side at the inner end of the rib C is the tongue G. The pivoting I prefer to accomplish by having a cylindrical lug $g$ on the upper edge of the tongue pass through a hole in the pan. A split cotter, passing through a hole $f$ in the lug, holds the tongue in place. Projecting upward from this tongue through a slot $h$ in the pan is the wedge or arrow-shaped block I. Pivoted to lugs $j$ on the upper side of the ribs C and D are the levers K and L, having their inner ends beveled, as shown at $k$ and $l$, at a point above the said wedge-shaped block. Depending from the outer ends of these levers are the triggers M and N, so formed as to loosely clasp around the ribs in a depression therein and lie in the path of the trolley-wheel. At the upper end of these triggers are supplied counterweights R and S, preferably made integral with the triggers, which cause the same to normally occupy a depressed position.

If the trolley-wheel (shown diagrammatically at U) should pass along the rib D, going toward the pan, it would press up the trigger N, which, overcoming the counterweight S and forcing downward the inner end of the lever L, would cause the latter to impinge against the wedge-shaped block I and thereby shift the tongue, so as to make a continuous track from the rib D through to the rib C, as shown in Fig. 2. As the trolley-wheel in leaving the switch passes over the depending trigger M it forces it upward, and the lever K thereby impinges upon the other side of the wedge-shaped block and forces the tongue back into connection with the rib E. In going the other way the trigger M would shift the tongue into connection with the rib D, and the trigger N would replace it in connection with the rib E as the trolley-wheel leaves the switch. Thus the rib E is normally connected with C, and a trolley-wheel running upon it would always find a continuous track, and as it ran over the trigger M the latter would rise idle without causing any operation. In order that there may be no tendency of the tongue to become accidentally misplaced if the switch should not be hung level, I prefer to provide a spring T, as shown, in the under side of the pan, engaging with the tongue in a notch Q on the upper side thereof and operating to hold the tongue in either extreme position until the desired amount of force is applied to cause its shifting. This spring may be so made as to itself be able to force the tongue to its seat on either side after it has passed the central point, whereby any looseness or play in the engagement of the levers with the wedge-shaped block, or in the other parts caused by wear or otherwise, produces no detrimental effect. It will thus be seen that if this switch is used at a turnout in a single-track road, for which use it is peculiarly adapted, one switch being placed at each end of the turnout, the cars coming toward the turnout would invariably have a continuous track for their trolleys leading to the respective branches of the turnout—to the right branch, for instance; and when the cars pass off of the turnout the trolley would also find a continuous track leading from the turnout to the main line. Thus there need be no delay of the car in passing these points on account of liability of the trolley-wheel to leave the switch.

The ribs and tongue are preferably of such depth that the trolley-wheel only bears at the bottom of its groove and does not have the periphery at the top of its groove come in contact with the plate or pan. The point of connection with its conductor is thus maintained continuous and the arcing between the trolley-wheel and the switch as it passes onto or off of the ribs is avoided. This greatly increases the life of the switch, as the points at the beginning of the ribs are not burned away.

If desired, a weather-hood, formed preferably like a gable-roof, may be placed over the pan of the switch to protect the operating parts from sleet or snow.

The foregoing specification describes the best embodiment of my invention at present known to me; but I do not wish to be understood as limiting myself to the specific form shown and described, as numerous mechanical modifications may be made without departing from my invention. The connection between the triggers and the tongue, for instance, may be varied, and equivalents may be substituted for many of the parts so long as the essential method of operation is retained.

Having thus described my invention, what I claim as new, and desire to secure by Letters Patent, is—

1. In a trolley-switch, in combination, a shiftable tongue and a trigger lying in the path of the tread of the trolley-wheel and adapted to be moved upward by the upward pressure of the trolley and thereby shift said tongue, for the purpose specified.

2. In a trolley-switch, in combination, three trolley-tracks, a shiftable tongue adapted to connect one of said tracks with either of the other two, and a trigger lying in the path of the tread of the trolley-wheel and adapted to be moved upward by the upward pressure of the trolley and thereby shift said tongue, for the purpose specified.

3. In a trolley-switch, in combination, a plate having three ribs extending therefrom, a tongue adapted to connect one of said ribs with either of the other two, a lever operating to shift the tongue and pivoted to one of said ribs and carrying a trigger which depends into the path of a trolley-wheel passing along said rib whereby the pressure of the trolley-wheel causes the tongue to shift, for the purpose specified.

4. In a trolley-switch, in combination, a plate, three ribs extending therefrom, a shiftable tongue adapted to connect one of said ribs with either of the other two, there being formed a recess in one of said ribs, a trigger operating to shift the tongue and adapted to occupy said recess and also adapted to depend therefrom into the path of the trolley-wheel, whereby a trolley-wheel passing along said rib presses said trigger out of the way into said recess and thereby shifts said tongue, for the purpose specified.

5. In a trolley-switch, in combination, a plate, three ribs extending therefrom, a shiftable tongue adapted to connect one of said ribs with either of the other two, a wedge-shaped block secured to said tongue, a lever engaging with a face of said block and operated by a trigger in the path of the trolley, whereby the trolley is adapted to shift the tongue, for the purpose specified.

6. In a trolley-switch, a plate, three ribs extending therefrom, a shiftable tongue adapted to connect one of said ribs with either of the other two, in combination with a trigger lying in the path of a trolley-wheel passing along that rib with which the tongue is always connected, and a trigger lying in the path of a trolley-wheel passing along one of the other ribs, said triggers operating when engaged by said trolley-wheel to shift the tongue, one in one direction and one in the other, whereby the tongue is caused to shift its position as the trolley approaches the tongue and to shift back after it has left the tongue, for the purpose specified.

7. In a trolley-switch, in combination, a plate having three ribs extending therefrom, a tongue having one end pivoted at the inner end of one of said ribs and having its other end adapted to lead to either of said remaining ribs, and a wedge-shaped block secured to said tongue and levers engaging with the opposing faces of said block and operated by triggers in the path of the trolley beyond each end of the tongue, whereby said tongue is adapted to be shifted in one direction by the trolley as it runs onto the switch and in the opposite direction by the trolley as it leaves the switch, for the purpose specified.

8. In a trolley-switch, in combination, a plate having three ribs extending therefrom, a tongue pivoted at the inner end of one of said ribs and adapted to connect said rib with either of the other two, in combination with a spring operating to hold said tongue in engagement with either of said ribs until a desired amount of force is applied to the tongue to remove it therefrom, in combination with mechanism operated by the trolley for applying such force to the tongue, for the purpose specified.

9. In a trolley-switch, in combination, a plate having three ribs extending therefrom, a tongue pivoted at the inner end of one of said ribs, said tongue being adapted to have its other end lead to either of the remaining ribs, said tongue having a wedge-shaped block projecting through a slot in said plate, a lever pivoted to that one of said ribs which is always in connection with the tongue and having a trigger loosely clasping said rib and thereby lying in the path of a trolley-wheel passing along said rib, the inner end of said lever adapted to contact with one of the faces of the wedge-shaped block and thereby shift the tongue in one direction and a lever pivoted to one of the other of said ribs and having a trigger adapted to be engaged by a trolley-wheel passing along that rib, said lever operating upon the other face of said wedge-shaped block whereby the tongue is shifted in the other direction when said last-mentioned trigger is operated, for the purpose specified.

10. In a trolley-switch, in combination, a plate having three ribs extending therefrom, a shiftable tongue adapted to connect one of said ribs with either of the other two, a lever pivoted to one of said ribs and operating to shift said tongue, a trigger connected with said lever and depending into the path of a trolley-wheel passing along said rib whereby a pressure upon said trigger is adapted to cause the tongue to shift, in combination with a counterweight operating to cause said trigger to normally depend into the path of the trolley-wheel, for the purpose specified.

11. In a trolley-switch, in combination, a plate having three ribs extending therefrom, a tongue adapted to connect one of said ribs with either of the other two, said tongue being pivoted to the plate by means of an integral lug on the tongue passing through the plate, a means for holding said lug from withdrawal from the plate, and a spring holding the tongue in either extreme position against displacement by a force of less than a predetermined amount, for the purpose specified.

LOUIS M. ERB.

Witnesses:
ALBERT H. BATES,
CHARLES L. HINE.